United States Patent

[11] 3,612,249

[72] Inventor Erich Schneider
 Wiesensteig, Germany
[21] Appl. No. 17,476
[22] Filed Mar. 9, 1970
[45] Patented Oct. 12, 1971
[73] Assignee Organisation Ralfs K.G.
 Wiesensteig, Germany
[32] Priority May 31, 1969
[33] Germany
[31] P 19 27 888.7

[54] VERTICAL CONVEYOR TRANSFER MEANS
 8 Claims, 3 Drawing Figs.
[52] U.S. Cl. .................................................... 198/38,
 198/165, 271/76, 271/DIG. 9
[51] Int. Cl. ...................................................... B65g 43/08
[50] Field of Search ............................................. 198/38,
 165, DIG. 16; 271/64, 76, DIG. 9; 214/96; 187/4

[56] References Cited
 UNITED STATES PATENTS
 862,148 8/1907 Filteau ........................ 271/76 X
 1,868,784 7/1932 Wood ........................... 271/64
 FOREIGN PATENTS
 784,790 10/1957 Great Britain ................ 271/DIG. 9

*Primary Examiner*—Evon C. Blunk
*Assistant Examiner*—Alfred N. Goodman
*Attorneys*—Richard Low and Murray Schaffer ABSTRACT: A vertical conveyor formed by a plurality of serially arranged upward and downward runs. Switch means are located between successive runs for transferring articles from one direction to the other. The switch means are provided with sensing devices for determining which articles are to be transferred and for controlling such transfer.

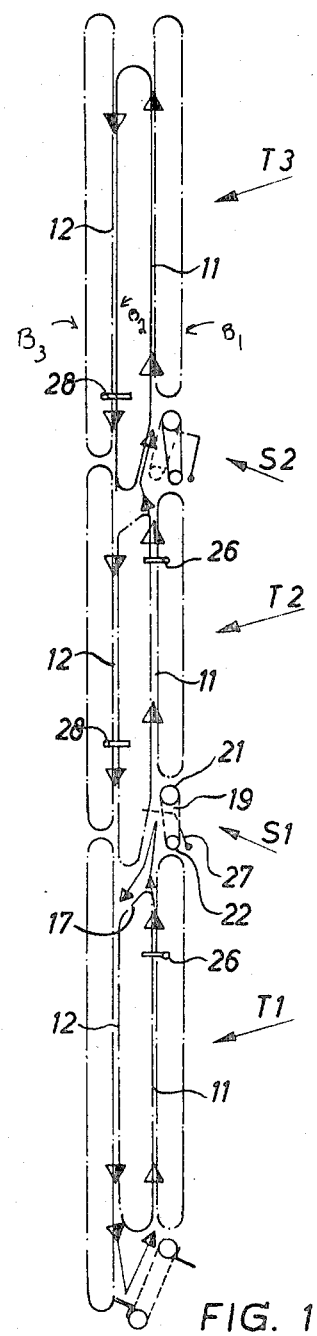
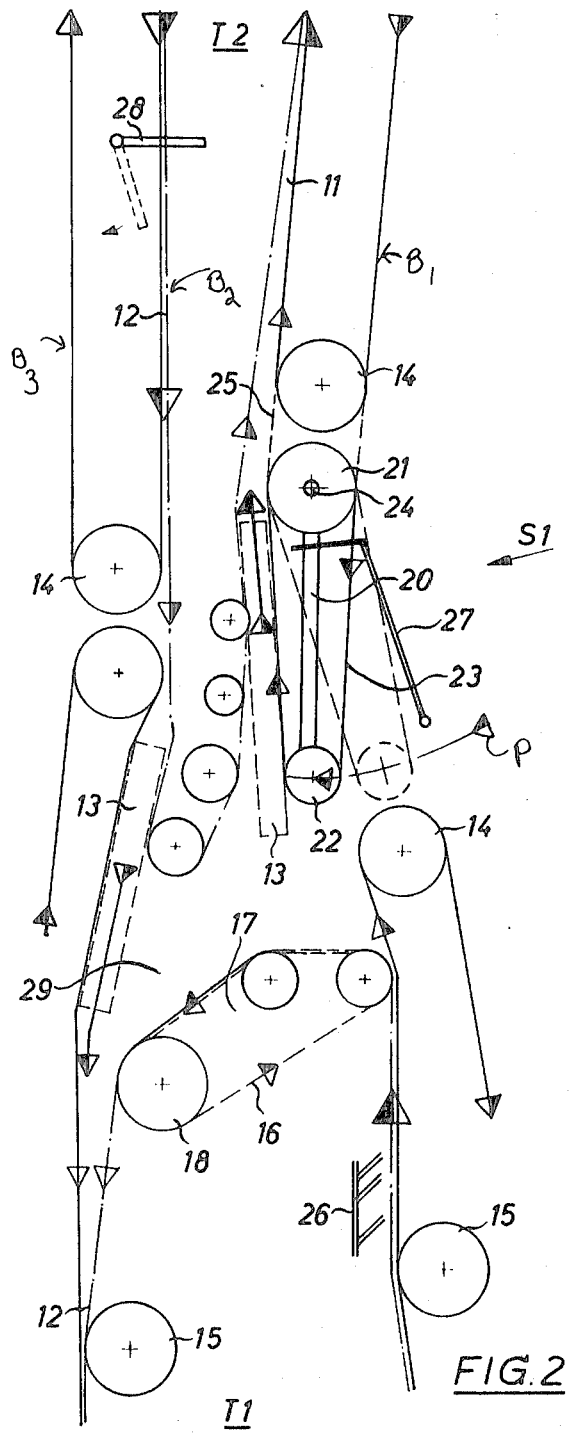
FIG. 1
FIG. 2
INVENTOR.
ERICH SCHNEIDER

VERTICAL CONVEYOR TRANSFER MEANS

The present invention relates to a belt conveyor for vertically transporting articles, and in particular, to a switch mechanism for transferring articles between the upward and downward runs thereof.

Endless conveyor belts, arranged in pairs to provide both upward and downward runs, have been used for some time to move articles such as written material, files and the like in suitable containers between different levels such as the floors of a building by transporting the container from a starting point upwardly to the top floor, where it is turned downwardly until it reaches a distributing conveyor or mechanism at a predetermined level or floor. In such arrangements, the containers travel over a long way to the ultimate destination, and transportation method is time consuming and the installation, therefore, is overburdensome.

In order to shorten the distance and length of time that the article is transported, the vertical path was subdivided into individual partial sections horizontally offset relative to each other and connected by means of short horizontal stretches of conveyor. Thus, by providing complex sensing systems, certain containers could be removed at the predetermined level without having to travel the entire upward distance first.

However, the horizontal offset sections require a large amount of lateral space, causing the undesirable and disadvantageous enlargement of the vertical conveyor shaft. Additionally, the numerous short horizontal stretches necessitates complex switching mechanisms and electrical controls and are consequently uneconomical.

It is therefore the object of the present invention to provide an improved belt conveyor system for transporting articles vertically.

It is another object of the present invention to provide a vertical conveyor system which is simply constructed, occupies little space and is economically constructed and operated.

It is a particular object of the present invention to provide a vertical conveyor formed of a plurality of serially arranged sections having an improved switch means for transferring articles between the upwardly and downwardly directed runs with ease and efficiency.

These and other objects and advantages will be apparent from the following disclosure.

SUMMARY OF THE PRESENT INVENTION

According to the present invention, a conveyor is provided comprising a series of consecutively arranged sections, each defining an upward conveyor run and a parallel downwardly conveyor run; the commonly directed runs being aligned sequentially with each other. A transfer mechanism or switch is located between selected sequentially arranged runs. The switches are movable to effect transfer from one run to the next run of the same direction or to the parallel run of opposite direction.

In the preferred form, the switch comprises a pivotal member which faces the end of one run and forms the beginning of the next sequential run. It is contemplated that in the preferred form, the container for the articles carries indicia of its destination and that means are provided for automatically sensing the indicia and for correspondingly operating the switch mechanism in response thereto.

There is also provided means for insuring the proper transfer and for avoiding collision between transfer containers and normally transported containers.

The present invention makes it possible to construct a simple conveyor system having substantially greater flexibility in establishing destinations. For example, a number of destinations may be made in the distance between floors, and the containers may be directed at any one rather than having to travel the entire distance to the top floor. Further, the container may be transferred between upward and downward conveyors until the proper destination is reached. Another advantage lies in the fact that a fewer number of control devices and operating mechanisms are required in addition to providing a relatively narrow conveyor.

A full and detailed description of the invention follows herein as well as the illustration of the aforementioned objects and advantages as well as numerous others.

BRIEF DESCRIPTION OF THE DRAWINGS

In the following description, reference is made to the accompanying drawings in which:

FIG. 1 is a schematic illustration of an embodiment of the present invention showing a conveyor and switch mechanism;

FIG. 2 is an enlarged view of the switch mechanism shown in FIG. 1; and

DESCRIPTION OF THE INVENTION

Figure 3:
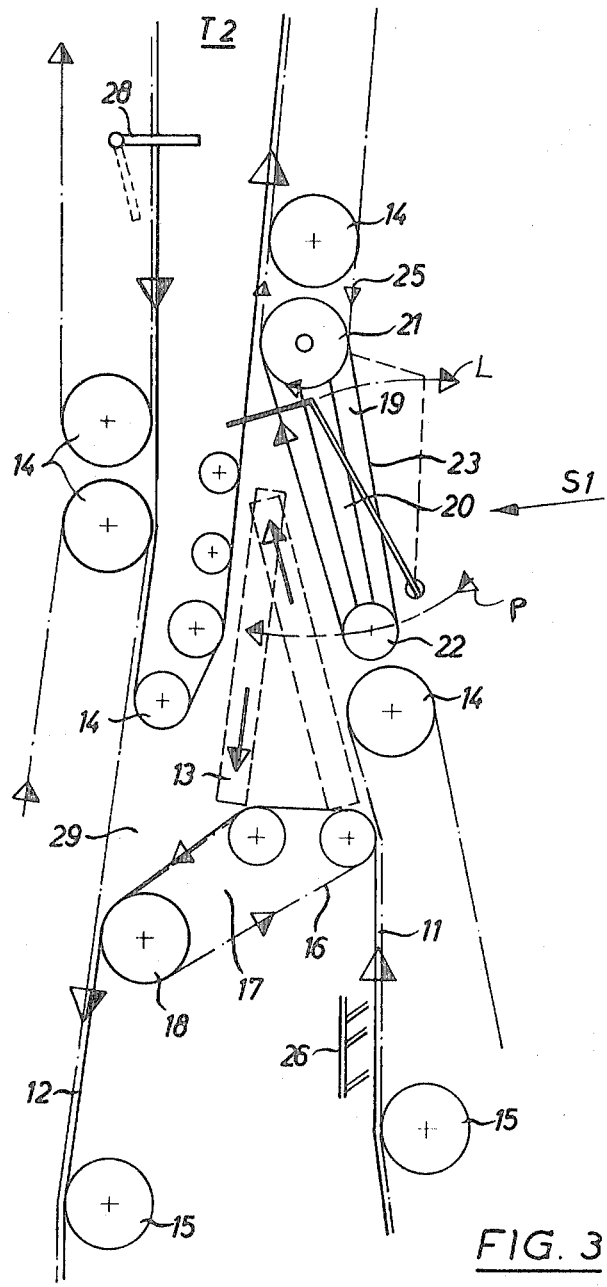
FIG. 3 is a view similar to that of FIG. 2 showing the switch mechanism in operation.

Before turning to the details of the present invention, reference is made to copending application, Ser. No. 17,242, filed on Mar. 6, 1970, by the same inventor, based upon German application No. P 19 38 388.1 filed July 29, 1969. That application relates to a belt conveyor of the same type and function, to which the present disclosure is directed, and concerns itself with the provision of feed and discharge devices for distributing the article containers at the proper and desired levels. Its disclosure is incorporated herein as if more fully set forth.

Turning now to FIG. 1 of the attached drawings, there is shown a portion of an elongated vertical conveyor comprising three consecutive partial sections $T_1$, $T_2$ and $T_3$ arranged in an end-to-end sequential series. While only three sections are shown, it will be appreciated that the conveyor may be formed of any number depending upon the length of the overall conveyor system, the number of intermediate destinations and other conditions. Each section $T_1$, $T_2$ and $T_3$ comprises an arrangement of three endless belts $B_1$, $B_2$ and $B_3$ placed side-by-side with their axes parallel to each other to form a pair of double runs 11 and 12. The belts are vertically offset so that their upper and lower ends are staggered to provide transfer passages $S_1$ and $S_2$ laterally of or transverse to their vertical direction, between the consecutive stretches.

The belts are synchronously driven so that the right and left side belts $B_1$ and $B_3$ form an upward run 11 and a downward run 12 respectively, in cooperation with the center belt $B_2$ as indicated by the arrows in the figures. The belts are so spaced and resiliently mounted as to carry a container 13 or other article within each run for transport both upwardly and downwardly, and are vertically aligned so that the container can be carried sequentially from one section to the next.

Each of the outside belts $B_1$ and $B_3$ are provided at their upper and lower ends with reversing rollers 14 and intermediate their ends with one or more idler guide rollers 15. The upper end 17 of the center belt $B_2$ is provided with a triangular array of rollers 18 covered by a belt 16 which is also driven synchronously with the other belts. At the lower end of the lowermost stretch $T_1$, there is provided a separate conveyor section having outwardly extending flights or other means for positively inserting the container 13 in the upward run 11.

The belts are provided with conventional drive means, not shown, such as an electrical motor and pulley and chain transmission means. Other conventional features may also be provided. In particular, the horizontal distribution conveyors, terminal positions, supporting frames and mechanism are also to be provided. These elements have not been shown in the drawing or described more fully herein because they are by and large conventional and well known to those skilled in this art, and therefore for the sake of brevity, clarity and conciseness, have been omitted.

The conveyor belts themselves may be made of any conventional material, such as plastic, rubber or fabric and need be only of dimensions sufficient to hold and support the article to be transferred with efficiency and sureness. The belt may be provided with holes or spaces, porous, and may even be articulated as required.

From FIG. 1, it will be seen that an article or container 13 inserted at the lower end of the vertical conveyor will travel upwardly within run 11 between belts $B_1$ and $B_3$ until it reaches the topmost reversing roller at the end of stretch $T_3$ and reverse into downward movement between belts $B_2$ and $B_3$, unless before reaching this point, the container is transferred at any one of the intermediate transfer points $S_1$ or $S_2$, to the downwardly moving run 12. Each of the transfer points $S_1$ or $S_2$ is, thus, provided with a switch assembly 19 for this purpose.

Since the switch assembly 19 is identical, only the details of one will be illustrated. FIGS. 2 and 3 show the assembly for transfer point $S_1$. The switch assembly is located between consecutive outside belts $B_1$ of the sections $T_1$ and $T_2$ which form the upward run 11 and comprises a rocker arm 20 carrying at its upper end a roller 21 and at its lower end a roller 22 about which an endless belt 23 is trained. The rocker 20 is pivotally journaled about a shaft 24 concentric with the roller 21 and parallel to the shaft about which the lowermost reversing roller 14 of the associated belt $B_1$ is journaled. A drive belt or chain 25 connects the shaft 24 with the roller 14 or its shaft in conventional manner so that the switch belt 23 is driven synchronously with the belt $B_1$.

The free end of the rocker 20 carrying the roller 22 faces the lower section $T_1$ and is movable arcuately in the path indicated by arrow P between an inner position (full line) and an outer position (dotted lines) as seen in FIG. 2. (In FIG. 3, the outer position is shown in full lines.) In the inner position, the belt 23 forms a linear extension of the belt $B_1$ and maintains a spacial distance from belt $B_2$ corresponding to that of run 11, while in the outer position, the belt 23 diverges from the central belt 32 to form an inverted funnellike space therebetween.

The rocker arm 20 is provided with a suitable remotely activated mechanism, such as a relay or solenoid operated pneumatic, hydraulic or simple mechanical motive means for selectively placing it in either of its two positions. Such apparatus is well known and consequently not necessary to illustrate here. The remote activation of the motive mechanism is provided through a sensing element 26, such as a microswitch, photoelectric cell, magnetic sensor or similar device located near the upper end of the lower portion of the run 11. The sensing device is designed to sense and determine the destination of the article container 13 and to provide an electrical pulse (or mechanical signal) to the motive mechanism for pivoting the rocker arm 20. The signal and motive means may be adapted either to permit the inward positioning of the rocker arm 20 so as to cause the article container to move into the run 11 of the next upper section $T_2$ or move the rocker arm 20 outwardly to create the enlarged space to force the container to turn on the belt 16 of end 17 into the downward run 12 of the same section.

The transition of the container 13 from the lower section $T_1$ to the next higher section $T_2$ is accomplished by maintaining the container clamped between the belt $B_1$ and the belt 16 of the lower section until its upper edge enters into and becomes clamped between the belt 23 and the spaced belt $B_2$ of the upper section $T_2$ as seen in FIG. 2, whereupon it continues its upward movement.

The transfer to this downward run 12 at the switch $S_1$ is shown in FIG. 3. In this situation, the signal derived from sensor 26 maintains the rocker arm 20 in outward position so that the container 13 cannot enter into and become clamped between the belt 23 and the belt $B_2$ of the upper section $T_2$. As a result, the lower end of the container rests, by force of gravity, on the belt 16 of the turnaround mechanism 17 and is moved in the direction of the arrow into the downwardly moving run 12. In order to facilitate the transfer and to insure smooth entrance of the container 13 into the downward run 12, the lower end of the belt $B_1$ of section $T_1$ and the upper end of the turnaround mechanism 17 are shaped to form a funnellike enlargement 29.

Further, a blocking lever 27 is provided in order to insure that not container, destined to be transferred at the switch assembly, inadvertently enters into the upward run 11 of the upper section $T_2$. The blocking lever 27 is a simple hooked rod connected at its lower end by conventional mechanisms, such as gearing or lever mechanisms, to the actuating motive means of the rocker arm 20 so as to be movable simultaneously therewith along an arcuate path shown by the arrow L in FIG. 3. This movement is opposite to the movement of rocker arm 20 in that when the arm 20 moves inwardly, the blocking lever 27 moves outwardly leaving the run 11 free while when the rocker arm 20 moves outwardly, the blocking lever 27 moves across the run 11 to prevent upward movement of any container. It will be understood that the lever 27 may be independently actuated by a separate motive means in direct response to the signal from sensor 26.

A second sensor 28 is provided to prevent the simultaneous movement of a container from the downward run 12 of the upper section $T_2$ and the transfer of a container from the run 11 to the run 12 through the switch assembly 19. The sensor 28 is located along the path of the downward run 12 above the transfer point $S_1$ and is adapted on deflection by a downwardly moving container to produce a signal negating the signal produced by the first sensor 26 when that signal calls for the transfer of a container from up to down. Consequently, collision between containers is avoided. When this occurs, the upwardly moving container is carried into the next higher section where, if the transfer point is free, it is subsequently transferred, as described or is carried upwardly to the topmost reversing point where it turns and eventually cones down.

It will thus be seen that each of the aforementioned objects and advantages are easily obtained by the construction of the present invention. It will be obvious that the switch mechanism may be reversed and positioned in association with the downward run so as to transfer containers as they move downwardly rather than upwardly. Combinations of the two may also be used.

Various modifications and changes may be made. For example, the switch mechanism may be preset to operate at time intervals or responsive to a signal given from a remote distance. The actual form of the switch mechanism may be varied and some other form of pivotal member used. Since such modifications and others will be apparent, to those skilled in this art, it is intended that the present description be illustrative only and not limiting of the present invention.

What is claimed is:

1. A conveyor for the vertical transport of articles comprising a series of consecutively arranged sections, each section comprising a first pair of endless belts cooperating to form an upwardly moving run and a second pair of endless belts cooperating to form a downwardly moving run, switch means located between each of said successive sections selectively movable between a first position for permitting passage of said articles from one run to a corresponding run in the next section and a second position effecting transfer of said articles from the one run to the oppositely moving run of the same section, and means for operating said switch means in response to a predetermined signal.

2. The conveyor according to claim 1 wherein one of the belts in each of said first and second pairs of belts is common to both said pairs.

3. The conveyor according to claim 1 wherein said articles carry indicia thereon indicative of their destination and said switch means is provided with a sensor for determining said indicia and providing said signal for the operation thereof.

4. The conveyor according to claim 2 wherein said switch means comprises a rocker arm pivoted at one end adjacent an end of the run in the next section and a free end movable between said first and second positions, said free end facing the end of the associated run of the preceding section, said rocker arm being provided with an endless belt and means for driving said endless belt synchronously with the belts of the associated runs, thereby to interconnect said associated runs when said rocker arm is in said first position.

5. The conveyor according to claim 4 wherein said common belt includes means for directing said article into said opposite run when transferred.

6. The conveyor according to claim 1 including sensing means located in the oppositely directed run for determining the presence of an article therein and for providing a signal thereof, and means responsive to said signal for preventing the switching of said switch means to transfer another article therein.

7. The conveyor according to claim 1 including means for blocking movement of an article in said next turn when said switch means is in said second position to transfer said article.

8. The conveyor according to claim 5 wherein the ends of the sequentially aligned belts are shaped to provide enlarged funnellike passages for the transfer of said containers.